United States Patent [15] 3,670,029
Romanelli [45] June 13, 1972

[54] PREPARATION OF UNSATURATED ETHERS

[72] Inventor: Michael G. Romanelli, New York, N.Y.
[73] Assignee: Esso Research and Engineering Company
[22] Filed: March 19, 1969
[21] Appl. No.: 808,672

[52] U.S. Cl. ...................260/612 D, 260/611 R, 260/611 A, 260/614 AA
[51] Int. Cl. .....................................C07c 41/06, C07c 41/10
[58] Field of Search ...............260/614, 614 A, 614 AO, 611, 260/611 A, 612 D; 252/431 P

[56] References Cited

UNITED STATES PATENTS

| 3,530,187 | 4/1920 | Shryne | 260/612 D X |
| 3,267,169 | 8/1966 | Smutny | 260/612 D X |
| 3,407,224 | 10/1968 | Smutny | 260/614 X |
| 3,499,042 | 3/1970 | Smutny | 260/614 |

OTHER PUBLICATIONS

Wilke et al., Angew Chem. Internat. Edit. Vol. 5 (1966) No. 2 pp. 159–161 copies attached
Muller et al., Angew Chem. 77 (1965) No. 7 pp. 318–323
Takahashi et al., I, Tetrahedron Letters, No. 26, pp. 2451–2453, 1967
Takahashi et al., II, Synth. Chem. Soc. Japan, Vol. 41, No. 1, pp. 254–255
Tsuji, J. Soc. Org. Synth Chem. Japan Vol. 22, pp. 1–2 1964

*Primary Examiner*—Howard T. Mars
*Attorney*—Chasan and Sinnock and J. E. Luecke

[57] ABSTRACT

Unsaturated ethers are prepared through the reaction of $C_4$ to $C_6$ aliphatic conjugated diolefins with a monohydroxy alcohol in the presence of a catalyst system based upon zero valent nickel. The preferred catalyst system is made up of a zero valent nickel material, a phosphine or isonitrile activator and further, if desired, an inorganic or organic base cocatalyst. The reaction is conducted at moderate temperature and pressure conditions. The unsaturated ethers can be catalytically hydrogenated to useful ether solvent media.

13 Claims, No Drawings

PREPARATION OF UNSATURATED ETHERS

BACKGROUND OF THE INVENTION

I. Field of the Invention

This invention relates to a process for the formation of unsaturated ethers. More particularly, this invention relates to a method for securing unsaturated ethers through the liquid phase reaction of aliphatic conjugated diolefins with aliphatic and aromatic monoalcohols in the presence of a catalyst system based upon zero valent nickel.

SUMMARY OF THE INVENTION

In accordance with the present invention, it has been discovered that unsaturated ether materials can be readily synthesized through the catalyzed oligomerization of conjugated aliphatic diolefins in the presence of an alkyl or aryl alcohol. The reaction is conducted in the liquid phase utilizing a homogeneous reaction system. Normally, the process is conducted at a temperature of less than about 125° C. in the substantial absence of oxygen. The catalyst system used to promote the reaction consists of a material that will provide a source of zero valent nickel at reaction conditions, a phosphine or isonitrile activator and optionally an inorganic or organic base cocatalyst.

The reaction proceeds in the manner illustrated in the Equation set forth below:

(1) 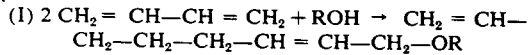 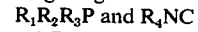

Equation I demonstrates the reaction of two moles of butadiene with a monoalcohol to form an octadienyl ether. While the major reaction product is a material having the ether substituent located at the 1 position, certain minor amounts of by-product materials including isomers of the principal product are also formed. The starting diolefinic reagent is preferably a $C_4$ to $C_6$ conjugated acyclic aliphatic hydrocarbon material. Preferably, the diolefins are unsubstituted materials. Examples of useful diolefins include butadiene, isoprene and piperylene.

As noted in Equation I, a monohydroxy reagent having the general formula ROH is used as a reactant in the synthesis of the unsaturated ether products. The symbol R of the general formula designates a phenyl radical, a monovalent acyclic or alicyclic alkyl radical having from one to eight, preferably one to five carbon atoms or a monovalent aralkyl or alkylaryl radical having seven to 12 carbon atoms. Useful alcohol compounds include phenol, methanol, ethanol, isopropanol, t-butanol, n-hexanol, cyclohexanol, cyclooctanol, 3-ethyl phenol, 3-phenylpropanol, etc.

The rate of reaction for the formation of the unsaturated ether compounds varies sharply with the type of alcohol coreactant employed. Reactions wherein a lower alkanol ($C_1$–$C_3$ straight chain materials) are used proceed in a rapid fashion; however, when R is a relatively bulky branched chain substituent, such as a tertiary butyl or isopropyl radical, the reaction proceeds at a substantially slower rate. The catalyst composition, in particular, the source of zero valent nickel is sensitive to the presence of oxygen and mineral acids. Hence, maximum catalyst efficiency is secured if the olefin, alcohol reactant and any solvent employed are purified prior to the use. Oxygen removal can be secured by sparging with an inert gas such as nitrogen.

The ether formation reaction can be carried out in bulk, that is, in the absence of a solvent or in the presence of an organic diluent that does not interfere with the course of the reaction. It is preferred that the reaction be conducted in a homogeneous reaction system. Ordinarily, the desired homogeneous system is secured without the use of extraneous solvents since the olefinic reactants are readily soluble in the alcohol coreactant. However, diluents that serve to solubilize both the alcohol and diolefin reagents can be used. Useful solvent materials include $C_3$–$C_{12}$ aliphatic alcohols and ethers and $C_5$–$C_{10}$ aliphatic and aromatic hydrocarbon materials. Representative examples of useful solvents include t-butanol, pentane, hexane, benzene, toluene, xylene, ethylbenzene, tetrahydrofuran, ethyl ether, 1,2-dimethoxy ethane, diethylene glycol dimethyl ether, polyethylene glycol dimethyl ether, dioxane, dimethoxy methane, etc.

Typically, the molar ratio of diolefin to alcohol within the reaction zone varies from between about 0.01:1 to 3:1, preferably 0.1:1 to 1:1. Solvents, if employed, can be used over a wide dilution range. For example, the reaction system, prior to addition of the diolefin, may be composed of from 15 to 90 volume percent, preferably 20 to 70 volume percent, of alcohol, based upon alcohol and solvent.

The catalyst system used to promote the formation of the olefin dimer ether product is composed of a zero valent nickel material, that is, zero valent nickel or a compound or complex (generally a zero valent nickel compound) that will yield zero valent nickel under the reaction conditions and an organic isonitrile or phosphine activator compound. The performance of the nickel/activator catalyst system can be enhanced with the use of a basic cocatalyst material. Zero valent nickel materials that will generate the desired zero valent nickel at reaction conditions include materials such as bis(1,5-cyclooctadiene)nickel, bis(pi-allyl)nickel, bis(cyclopentadienyl)nickel, tetrakis(triphenylphosphine)nickel, etc.

The activator compounds that can be employed in conjunction with the source of zero valent nickel are organic phosphines, preferably triorganophosphine compounds, and isonitrile materials having the general formulas:

$$R_1R_2R_3P \text{ and } R_4NC$$

wherein $R_1$, $R_2$, $R_3$ and $R_4$ are monovalent organic radicals having from one to 12, preferably one to eight carbon atoms per molecule. Preferably, $R_1$, $R_2$, $R_3$ and $R_4$ are monovalent acyclic or alicyclic alkyl radicals having from 1 to 8 carbon atoms; a phenyl radical; a monovalent alkylaryl radical having from seven to 12, preferably seven to 10, carbon atoms and a monovalent aralkyl radical having from seven to 12, preferably seven to 10, carbon atoms. Representative examples of useful activator compounds include triphenylphosphine, tricyclohexylphosphine, tributyl phosphine, diethylphenylphosphine, methyldiphenylphosphine, tris(p-tolyl)phosphine, tris(m-tolyl)phosphine, tris(4-methyl cyclohexyl) phosphine, tris(xylyl)phosphine, triethylphosphine, tribenzyl-phosphine, tris(phenylethyl)phosphine, methylisonitrile, ethylisonitrile, t-butylisonitrile, cyclohexylisonitrile, phenylisonitrile, p-tolylisonitrile, etc. The activator compound may be a constituent part of the material that serves as the source of zero valent nickel. For example, tetrakis(tri-phenylphosphine)nickel is a material that yields zero valent nickel at reaction conditions and also contains the necessary activator substituent.

The phosphine and isonitrile activator materials are well known chemical compositions. Isonitriles are conveniently prepared by heating a primary amine with chloroform and sodium hydroxide. Phosphines may be prepared by reacting a phosphorus halide, such as phosphorus trichloride, with an alkyl or aryl organometallic compound, e.g., butyllithium, phenyl magnesium chloride, etc. The zero valent nickel compounds can be secured using a variety of techniques. For example, bis(1,5-cyclooctadiene)nickel can be prepared by reducing nickel salts, such as nickel acetylacetonate, with alkyl aluminum compounds, such as triethyl aluminum, in the presence of 1,5-cyclooctadiene. Bis(pi-allyl)nickel is secured by treating a nickel salt, such as nickel chloride, with allyl magnesium chloride. Bis(cyclopentadienyl)nickel is prepared by treating a nickel salt, such as nickel chloride, with sodium cyclopentadienide. Lastly, tetrakis(triphenyl-phosphine)nickel can be prepared by reacting bis(1,5-cyclooctadiene)nickel with triphenyl phosphine or by contacting potassium tetracyanonickel [0] with triphenyl phosphine. Activator activity is highly specific. Experiments have shown that closely related arsine, phosphite and trifluorophosphine compounds are not desirable activator compounds.

The performance of the zero valent nickel/activator catalyst system can be greatly enhanced by using either an organic or inorganic base material in conjunction with the two component catalyst system. Preferred basic materials include quaternary hydrocarbyl ammonium hydroxides and alkoxides having from four to 20, preferably four to 12 carbon atoms, alkali and alkaline earth metal hydroxides, and alkoxides of alkali metals and alkaline earth metals having from one to 12, preferably one to four carbon atoms. Since the use of inorganic hydroxides adversely affects the solubility of the diolefin within the reaction system, it is preferred that quaternary hydrocarbyl ammonium hydroxides and alkoxides be used as the process cocatalysts. Useful cocatalyst materials include tetraalkylammonium hydroxides and alkoxides, alkylpyridinium hydroxides, trialkylaralkyl ammonium hydroxides and alkoxides, such as trimethylbenzyl-ammonium hydroxide and methoxide and metal hydroxides and alkoxides such as sodium potassium and lithium methoxide, ethoxide, isopropoxide, t-butoxide and the like.

The nickel catalyst is employed in amounts ranging from about 0.001 to 1.0 moles of catalyst per liter of alcohol reagent present within the reaction zone. It is preferred that about 0.1 moles of catalyst be used per liter of alcohol present within the reaction zone. Phosphine activators are desirably employed in a large molar excess relative to the zero valent nickel material. Up to 150 moles of phosphine activator compound may be used per mole of zero valent nickel compound. Preferably, at least about 10 moles of phosphine activator compound are used per mole of zero valent nickel compound; however, the reaction does proceed when the nickel compound is present in excess.

The basic cocatalyst may be used in concentrations substantially identical to or higher than the zero valent nickel compound concentration. At least about 0.001 moles of base is used per liter of alcohol reagent. The upper limit on base concentration may vary over a wide range with it being possible to use more than about 1 mole of base per liter of alcohol. However, the presence of inorganic bases within the reaction zone adversely affects the solubility of the diolefin in the system. Hence, it is ordinarily desirable to maintain base concentration at the lowest effective level consistent with securing a desirable rate of reaction.

The reaction for the formation of the ether products is conducted in the liquid phase. Although the reaction proceeds at a much faster rate at elevated temperatures, the nickel catalyst constituent tends to be inactivated at temperatures substantially above 125° C. Normally, the reaction is carried out at a temperature ranging from between about 0° and 125° C., preferably between 50° and 100° C. The reaction pressure, that is the pressure maintained within the reaction zone, is typically the autogenous pressure exerted by the reactants and solvent at reaction temperatures. No apparent advantage is secured in using either reduced or elevated pressures. The length of the reaction period depends upon a number of process variables. High product yields are secured at the above-described temperature and pressure conditions within about 2 to 60 hours. Typically, substantial product yields are secured within from 10 to 20 hours.

The unsaturated ether compounds produced have many uses. The compositions may be hydrogenated in the liquid phase in the presence of typical hydrogenation catalysts such as nickel, platinum, palladium, etc. and reduced to the corresponding saturated ether. The saturated ether product may be used as an ingredient in cosmetic formulations and may also be employed in solvent applications, particularly as constituents in paint or varnish compositions.

DESCRIPTION OF THE PREFERRED EMBODIMENTS

The invention will be further understood by reference to the following examples:

EXAMPLE 1

A series of tests were conducted to demonstrate the suitability of phosphine activated zero valent nickel as a catalyst

TABLE I

| Run | Nickel catalyst | Grams catalyst | Activator | Grams activator | Catalyst/activator molar ratio | Butadiene (grams) | Temp., °C. | Time (hours) | Product (grams) | Percent 1-alkoxy product | Grams 1-alkoxy product/gram Ni/hour | Percent 3-alkoxy product | Grams 3-alkoxy product/gram Ni/hour |
|---|---|---|---|---|---|---|---|---|---|---|---|---|---|
| 1 | Ni(COD)₂ [a] | 0.1570 | Ph₃P [b] | 0.1303 | 1.11 | 10.4 | 58 | 68.0 | | | | | |
| 2 | Ni(COD)₂ [a] | 0.1234 | Ph₃P [b] | 1.8999 | 80.1 | [c] 4.0 | 60 | 2.1 | 22.5 | 87.9 | 360 | 11.6 | 47.7 |
| 3 | Ni(COD)₂ [a] | 0.0249 | Ph₃P [b] | 2.851 | 100 | [c] 4.7 | 60 | 3.17 | 0.361 | 87.5 | 18.8 | 11.6 | 2.14 |
| 4 | Ni(COD)₂ [a] | 0.0299 | Ph₃P [b] | 0.1303 | 1.11 | 4.7 | 60 | 3.17 | 0.764 | 83.0 | 31.0 | 15.7 | 3.72 |
| 5 | Ni(COD)₂ [a] | 0.1234 | Ph₃P [b] | 0.436 | 16.3 | 4.0 | 55 | 2.1 | 22.5 | 87.9 | 750 | | |
| 6 | Ni(COD)₂ [a] | 0.044 | Et₂PhP [d] | 1.004 | 64.7 | 4.3 | 60 | 20.0 | | 55.6 | 5.44 | 26.9 | 2.65 |
| 7 | Ni(COD)₂ [a] | 0.0257 | Et₂PhP [d] | 0.3239 | 10.3 | 4.6 | 60 | 23.1 | | 52.6 | 1.98 | 20.9 | 0.79 |
| 8 | Ni(COD)₂ [a,e] | 0.0426 | Bu₃P [f] | 2.127 | 100 | 4.6 | 60 | 20.0 | | 50.9 | 2.3 | 31.4 | 1.42 |
| 9 | Ni(COD)₂ [a] | 0.029 | Bu₃P [f] | 0.057 | 10.2 | 5.0 | 60 | 20.3 | 0.819 | 58.8 | 0.78 | 23.2 | 0.303 |
| 10 | Ni(C₅H₅)₂ [g] | 0.071 | Ph₃P | 0.072 | 10.0 | 6.5 | 60 | 70.3 | 0.163 | 48.4 | 0.025 | 9.65 | 0.01 |
| 11 | Ni(COD)₂ [a] | 0.057 | [h] | 0.803 | 10.0 | 10.4 | 60 | 23.1 | [c] | 4.14 | 0.14 | 0.41 | 0.01 |
| 12 | Ni(COD)₂ [a] | 0.069 | [i] | 0.766 | 10.0 | 9.4 | 60 | 18.7 | [c] | 32.6 | 2.33 | 11.8 | 0.85 |
| 13 | Ni(COD)₂ [a] | 0.069 | [j] | 0.758 | 9.97 | 9.7 | 60 | 19.7 | [c] | 35.9 | 3.98 | 17.1 | 1.89 |

[a] Ni(COD)₂ designates bis(1,5-cyclooctadiene)nickel. [b] Ph₃P designates triphenyl phosphine. [c] Reaction vessel repressurized with butadiene. [d] Et₂PhP designates diethylphenylphosphine. [h] Tricyclohexylphosphine.
[e] Product not isolated; product analysis made using gas-liquid chromatographic techniques. [f] Bu₃P designates tributylphosphine. [g] Ni(C₅H₅)₂ designates bis(cyclopentadienyl) nickel.
[i] Tris(p-tolyl)phosphine. [j] Tris(m-tolyl)phosphine.

for promoting the formation of octadienyl ethers. Each of the tests involved the reaction of butadiene with methanol. In each instance, a nitrogen purged mixture consisting of the nickel catalyst, the phosphine activator, butadiene and methanol were introduced into the reaction vessel of a typical Parr pressure apparatus. After addition of catalyst and reagents, shaking of the reaction vessel was commenced and the reaction vessel simultaneously heated to reaction temperature. This temperature was maintained for the period of the reaction. Upon completion of the reaction period, the vessel was vented and the liquid contents diluted with from 2 to 3 volumes of water. Thereafter, the organic layer was separated from the water layer and the latter extracted with pentane. The resulting pentane layer was then washed with water and dried over magnesium sulfate. The pentane was then evaporated and the resulting product subjected to various analytical procedures to determine the amount and identity of reaction products. Except for Run 1, in which 30 milliliters of methanol were used, all tests were conducted with 50 milliliters of reagent grade methanol. The identity of the various catalysts and activators employed as well as reaction conditions and the product yields secured are set forth in Table I.

The data set forth in Table I above clearly indicates the effectiveness of the zero valent nickel/phosphine catalyst system for promoting the formation of octadienyl ethers from butadiene and methanol. Run 1 demonstrates the necessity of employing an activator along with the zero valent nickel compound. When an activator is not used, the reaction does not proceed to the formation of product.

EXAMPLE 2

Following the general procedure of Example 1, butadiene was reacted with methanol at 60° C. in the presence of a catalyst system composed of bis(1,5-cyclooctadiene)nickel and cyclohexyl-isonitrile in a molar ratio of 1:1. After completion of a 2 hour reaction period, the isolated reaction products were analyzed and were found to be composed of about 91 weight percent of 1-methoxy octadiene and about 9 weight percent of 3-methoxy octadiene.

EXAMPLE 3

Following the procedure of Example 1, two moles of piperylene are reacted with n-heptanol at 45° C. in the presence of a catalyst system composed of tetrakis(triphenylphosphine) nickel, phenyldibutylphosphine, and lithium methoxide. The product recovered is composed predominantly of heptyl dimethyl-octadienyl ether.

EXAMPLE 4

To demonstrate the effect of basic cocatalysts, two substantially identical experiments were carried out in which butadiene was reacted with methanol at 80° C. In the first experiment, 10 grams of butadiene and 100 milliliters of methanol were mixed with 0.1068 gram of bis(1,5-cyclooctadiene) nickel and 1.0025 grams of triphenylphosphine (molar ratio of phosphine to nickel being 10:1). The reaction mixture also contained 0.5276 gram of t-butylbenzene as a gas chromatographic calibration standard. A small portion of the reaction product secured after 1, 2 and 3 hours of reaction time was analyzed to determine the rate of formation of 1-methoxy octadiene and 3-methoxy octadiene. The analysis of the reaction product indicated that the 1-methoxy product was being formed at the rate of 19.2 grams of product per gram of nickel per hour after one hour of reaction time; 18.2 grams of product per gram of nickel per hour after 2 hours of reaction time and 14.8 grams of product per gram of nickel per hour after 3 hours of reaction time. The 3-methoxy product was being formed at the rate of 8.17 grams of product per gram of nickel per hour after 1 hour of reaction time; 6.19 grams of product per gram of nickel per hour after 2 hours of reaction time and 5.91 grams of product per gram of nickel per hour after 3 hours of reaction time.

In the parallel run, 10.7 grams of butadiene were reacted with 100 milliliters of methanol in the presence of a catalyst system composed of 0.1051 gram of bis(1,5-cyclooctadiene) nickel, 1.0001 grams of triphenylphosphine (ratio of activator to nickel compound being 10:1) and 3 milliliters of a 40 weight percent solution of benzyltrimethylammonium methoxide contained in methanol. The reaction mixture also contained 0.5095 gram of the gas chromatograph calibration standard employed in the previous test. Again, the reaction product was sampled to determine rate of formation of product relative to the amount of nickel catalyst employed. It was found that after 1 hour of reaction time the rate of formation of 1-methoxy product was 40.1 grams of product per gram of nickel per hour. After 2 hours of reaction time, product was being formed at the rate of 27.1 grams of product per gram of nickel per hour. After 3 hours of reaction time, the 1-alkoxy product was being formed at the rate of 21.7 grams of product per gram of nickel per hour. Additionally, after 1 hour of reaction time, it was found that the 3-methoxy product was being formed at the rate of 11.3 grams of product per gram of nickel per hour. After 2 hours, 8.88 grams of the 3-methoxy product were being formed per gram of nickel per hour. After 3 hours of reaction time, the 3-methoxy product was being formed at the rate of 8.3 grams of product per gram of nickel per hour.

A comparison of the two parallel tests indicates the desirability of using a basic cocatalyst in the reaction system. Specifically, significant increases in the rate of product formation were encountered with its use.

I claim:

1. A process for the formation of unsaturated ethers which comprises contacting in the liquid phase, said liquid phase being free of oxygen, a $C_4$ to $C_6$ conjugated acyclic diolefin with a monoalcohol reagent having the general formula ROH wherein R is selected from the group consisting of a phenyl radical, a monovalent alkyl radical having from one to eight carbon atoms and monovalent aralkyl and alkylaryl radicals having from seven to 12 carbon atoms in the presence of a zero valent nickel material, said zero valent nickel material being selected from the group consisting of bis(pi-allyl)nickel, bis(cyclopentadienyl)nickel, tetrakis(triphenyl phosphine)nickel, and bis(1,5-cyclooctadiene)nickel and an activator selected from the group consisting of organic isonitriles and phosphine compounds having the general formulas: $R_1R_2R_3P$ and $R_4NC$ wherein $R_1$, $R_2$, $R_3$ and $R_4$ are selected from the group consisting of monovalent alkyl radicals having from one to eight carbon atoms, phenyl radicals, monovalent alkylaryl radicals having from seven to 12 carbon atoms, and monovalent aralkyl radicals having from seven to 12 carbon atoms at a temperature ranging from between about 0° C. to 125° C. and thereafter recovering a yield of said products.

2. The process of claim 1 wherein said zero valent nickel material is employed in amounts ranging from about 0.001 to 1 mole per liter of alcohol reagent present within the reaction zone.

3. The process of claim 1 wherein said diolefin is butadiene.

4. The process of claim 1 wherein said process is conducted in the further presence of a basic cocatalyst material selected from the group consisting of quaternary hydrocarbyl ammonium hydroxides, and quaternary hydrocarbyl ammonium alkoxides.

5. The process of claim 4 wherein said basic cocatalyst material is employed in amounts ranging from about 0.001 to 1 mole of base per liter of alcohol.

6. A process for the formation of unsaturated ethers which comprises contacting in the liquid phase said liquid phase being free of oxygen, a solution of a $C_4$ to $C_6$ acyclic conjugated diolefin and a monohydroxy coreactant selected from the group consisting of phenol and lower alkanols having from one to eight carbon atoms in the presence of a zero valent nickel material, said zero valent nickel material selected from the group consisting of bis(1,5-cyclooctadiene)nickel, bis(pi-allyl)nickel, bis(cyclopentadienyl)nickel and tetrakis(triphenylphosphine)nickel, and a molar excess, relative to said zero valent nickel material, of a triorganophosphine compound selected from the group consisting of triphenylphosphine, tribenzylphosphine, tributylphosphine, tricyclohexylphosphine, diethylphenylphosphine, and phenyldibutylphosphine, said contacting conducted at a temperature ranging from about 0° to 125° C. and thereafter recovering a yield of said products.

7. The process of claim 6, wherein said zero valent nickel material is combined with said activator as tetrakis(triphenylphosphine)nickel.

8. The process of claim 6 wherein said contacting is conducted in the further presence of a basic cocatalyst selected from the group consisting of quaternary hydrocarbyl ammonium hydroxides and alkoxides having from four to 12 carbon atoms.

9. The process of claim 6 wherein said alkanol has from one to five carbon atoms.

10. The process of claim 6 wherein said process is conducted at a temperature ranging from 50° to 100° C.

11. The process of claim 6 wherein at least about 10 moles of phosphine compound is employed per mole of zero valent nickel compound.

12. The process of claim 8 wherein said diolefin is butadiene.

13. The process of claim 11 wherein said zero valent nickel material is bis(1,5-cyclooctadiene)nickel, said triorganophosphine compound is triphenylphosphine, and said basic cocatalyst is a quaternary hydrocarbyl ammonium hydroxide.

* * * * *